(12) United States Patent
Takahashi et al.

(10) Patent No.: US 10,629,960 B2
(45) Date of Patent: Apr. 21, 2020

(54) METHOD OF RECYCLING SECONDARY BATTERY AND SECONDARY BATTERY SYSTEM

(71) Applicant: TOYOTA JIDOSHA KABUSHIKI KAISHA, Toyota-shi, Aichi-ken (JP)

(72) Inventors: Kenji Takahashi, Toyota (JP); Hiroyuki Kaiya, Nagakute (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 93 days.

(21) Appl. No.: 16/101,579

(22) Filed: Aug. 13, 2018

(65) Prior Publication Data

US 2019/0074553 A1   Mar. 7, 2019

(30) Foreign Application Priority Data

Sep. 1, 2017   (JP) .................. 2017-168533

(51) Int. Cl.
| | |
|---|---|
| *H01M 10/42* | (2006.01) |
| *H01M 10/48* | (2006.01) |
| *H01M 4/32* | (2006.01) |
| *H01M 10/30* | (2006.01) |
| *H02J 7/00* | (2006.01) |
| *H01M 4/24* | (2006.01) |

(52) U.S. Cl.
CPC ......... *H01M 10/4242* (2013.01); *H01M 4/32* (2013.01); *H01M 10/30* (2013.01); *H01M 10/42* (2013.01); *H01M 10/48* (2013.01); *H01M 10/484* (2013.01); *H01M 10/486* (2013.01); *H02J 7/0026* (2013.01); *H01M 4/24* (2013.01); *H01M 2220/20* (2013.01); *H02J 7/0047* (2013.01); *H02J 2007/0049* (2013.01)

(58) Field of Classification Search
CPC ........... H01M 10/4242; H01M 10/486; H01M 10/484; H01M 10/30; H01M 10/42; H01M 10/48; H01M 4/32; H02J 7/0026; H02J 7/00
USPC ........ 320/132; 429/223, 224, 229, 220, 221, 429/206, 222, 231, 10, 122, 131, 9, 27, 429/44

See application file for complete search history.

(56) References Cited

FOREIGN PATENT DOCUMENTS

JP   2011-233423 A   11/2011

*Primary Examiner* — Richard Isla
*Assistant Examiner* — Dung V Bui
(74) *Attorney, Agent, or Firm* — Sughrue Mion, PLLC

(57) ABSTRACT

A method of recycling a battery pack includes first to third steps. The first step is a step of estimating an amount of generation of $Ni_2O_3H$ in a positive electrode of the battery pack based on a voltage value and a temperature of the battery pack. The second step is a step of recycling the battery pack for a high-capacity application when the estimated amount of generation is equal to or smaller than a prescribed reference amount. The third step is a step of recycling the battery pack for a high input-and-output application when the estimated amount of generation is greater than the reference amount and not greater than a reference amount.

8 Claims, 16 Drawing Sheets

FIG.15

| FULL CHARGE CAPACITY | Ca | Cb | Cc | Cd | Ce | --- | --- | |
|---|---|---|---|---|---|---|---|---|
| TOTAL AMOUNT OF $Ni_2O_3H$ | Wa | Wb | Wc | Wd | We | --- | --- | |

MP2

METHOD OF RECYCLING SECONDARY BATTERY AND SECONDARY BATTERY SYSTEM

This nonprovisional application is based on Japanese Patent Application No. 2017-168533 filed with the Japan Patent Office on Sep. 1, 2017, the entire contents of which are hereby incorporated by reference.

BACKGROUND

Field

The present disclosure relates to a method of recycling a secondary battery and a secondary battery system, and more particularly to a technique of recycling a secondary battery containing a nickel-based compound as a positive electrode active material.

Description of the Background Art

Electrically powered vehicles such as hybrid vehicles have increasingly been used in recent years as environmentally friendly vehicles. Some of such electrically powered vehicles incorporate battery packs constituted of secondary batteries (nickel metal hydride batteries) containing a nickel-based compound as a positive electrode active material. In general, the battery pack deteriorates with increase in distance of travel of the electrically powered vehicles or over time and a full charge capacity of the battery pack lowers.

For example, Japanese Patent Laying-Open No. 2011-233423 describes lowering in full charge capacity as a result of generation of $Ni_2O_3H$ in a positive electrode of a nickel metal hydride battery. According to Japanese Patent Laying-Open No. 2011-233423, generation of $Ni_2O_3H$ in the positive electrode is suppressed by appropriately designing a length and a height (width) of the positive electrode. Consequently, lowering in full charge capacity of the nickel metal hydride battery can be suppressed.

SUMMARY

With widespread use of electrically powered vehicles, the number of battery packs of which full charge capacity has lowered due to generation of $Ni_2O_3H$ in positive electrodes has also increased. Therefore, it is desirable to appropriately determine recyclability of battery packs of which full charge capacity has lowered and to recycle recyclable battery packs. Though Japanese Patent Laying-Open No. 2011-233423 describes such a deterioration phenomenon that a full charge capacity lowers due to generation of $Ni_2O_3H$, it does not pay particular attention to recycle of battery packs of which full charge capacity has lowered.

The present disclosure was made to solve the problem above and an object thereof is to effectively make use of a recyclable secondary battery in a method of recycling a secondary battery containing a nickel-based compound as a positive electrode active material.

Another object of the present disclosure is to determine an application in which a secondary battery can be made effective use of in a secondary battery system configured to determine an application in recycling a secondary battery containing a nickel-based compound as a positive electrode active material.

(1) A method of recycling a secondary battery according to one aspect of the present disclosure is a method of recycling a secondary battery containing a nickel-based compound as a positive electrode active material. The recycling method includes first to third steps. The first step is a step of estimating an amount of $Ni_2O_3H$ generated in a positive electrode of the secondary battery based on a detection value (a voltage value, a current value, or a temperature) resulting from detection of a state of the secondary battery. The second step is a step of recycling the secondary battery for a high-capacity application when the estimated amount of $Ni_2O_3H$ is smaller than a prescribed reference amount. The third step is a step of recycling the secondary battery for a high input-and-output application when the estimated amount of $Ni_2O_3H$ is greater than the reference amount.

(2) A full charge capacity of the secondary battery lowers with increase in amount of $Ni_2O_3H$. Preferably, the reference amount is determined based on the full charge capacity of the secondary battery.

(3) Lowering in electric power which can be input to and output from the secondary battery is mitigated with increase in the above-described amount of $Ni_2O_3H$. Preferably, the reference amount is determined based on the electric power which can be input to and output from the secondary battery.

(4) Preferably, the high-capacity application includes a vehicle-mounted application.

(5) Preferably, the high input-and-output application includes an application as a stationary power supply for electric power regulation.

(6) Preferably, the step of estimating an amount of $Ni_2O_3H$ (the first step) includes a step of estimating the amount of $Ni_2O_3H$ generated in the positive electrode based on a voltage and a temperature of the secondary battery by using data (for example, a map MP1 which will be described later) showing relation of the voltage and the temperature of the secondary battery with the amount of $Ni_2O_3H$ generated in the positive electrode.

(7) Preferably, the step of estimating an amount of $Ni_2O_3H$ (the first step) includes a step of estimating the amount of $Ni_2O_3H$ generated in the positive electrode based on a full charge capacity found from a voltage and a current of the secondary battery by using data (for example, a map MP2 which will be described later) showing relation between the full charge capacity of the secondary battery and the amount of $Ni_2O_3H$ generated in the positive electrode.

(8) A secondary battery system according to another aspect of the present disclosure is a secondary battery system configured to determine an application in recycling a secondary battery containing a nickel-based compound as a positive electrode active material. The secondary battery system includes a storage device and a determination device. The storage device is configured to store data showing relation between a voltage value and a current value of the secondary battery and an amount of $Ni_2O_3H$ generated in a positive electrode of the secondary battery. The determination device is configured to calculate a full charge capacity of the secondary battery from the voltage value and the current value of the secondary battery, to estimate an amount of $Ni_2O_3H$ generated in the positive electrode based on the calculated full charge capacity and the data, and to determine an application in recycling the secondary battery based on the estimated amount of generation. The determination device is configured to determine that the secondary battery is to be recycled for a high-capacity application when the estimated amount of $Ni_2O_3H$ is smaller than a prescribed reference amount and to determine that the secondary battery is to be recycled for a high input-and-output application when the estimated amount of $Ni_2O_3H$ is greater than the reference amount.

The present inventors have paid attention to the fact that a full charge capacity of a secondary battery in which an amount of generation of $Ni_2O_3H$ is greater than a reference amount lowers whereas such a secondary battery has characteristics suitable for use like a capacitor (details of which will be described later). In a high-capacity application (for example, a vehicle-mounted application), lowering in full charge capacity of the secondary battery leads to poorer fuel efficiency or poorer drivability and hence the full charge capacity is a particularly important property. On the other hand, high importance is not placed on a high full charge capacity. Rather, there are also applications where high input-and-output characteristics are important (for example, an application as a secondary battery for electric power regulation in an electric power supply facility such as a power station, the application being hereinafter also referred to as a "high input-and-output application"). Therefore, according to the feature and the method, whether or not a secondary battery is suitable for a high-capacity application or a high input-and-output application is determined. A recyclable secondary battery can thus be made effective use of. In particular, by recycling a secondary battery in which a total amount of generation of $Ni_2O_3H$ is greater than a reference amount in an electric power supply facility, advantages of the high input-and-output characteristics can be exploited while disadvantages of lowering in full charge capacity with generation of $Ni_2O_3H$ are mitigated.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 15 is a diagram showing one example of a map in a second embodiment.

DESCRIPTION OF THE PREFERRED EMBODIMENTS

Figure 1:
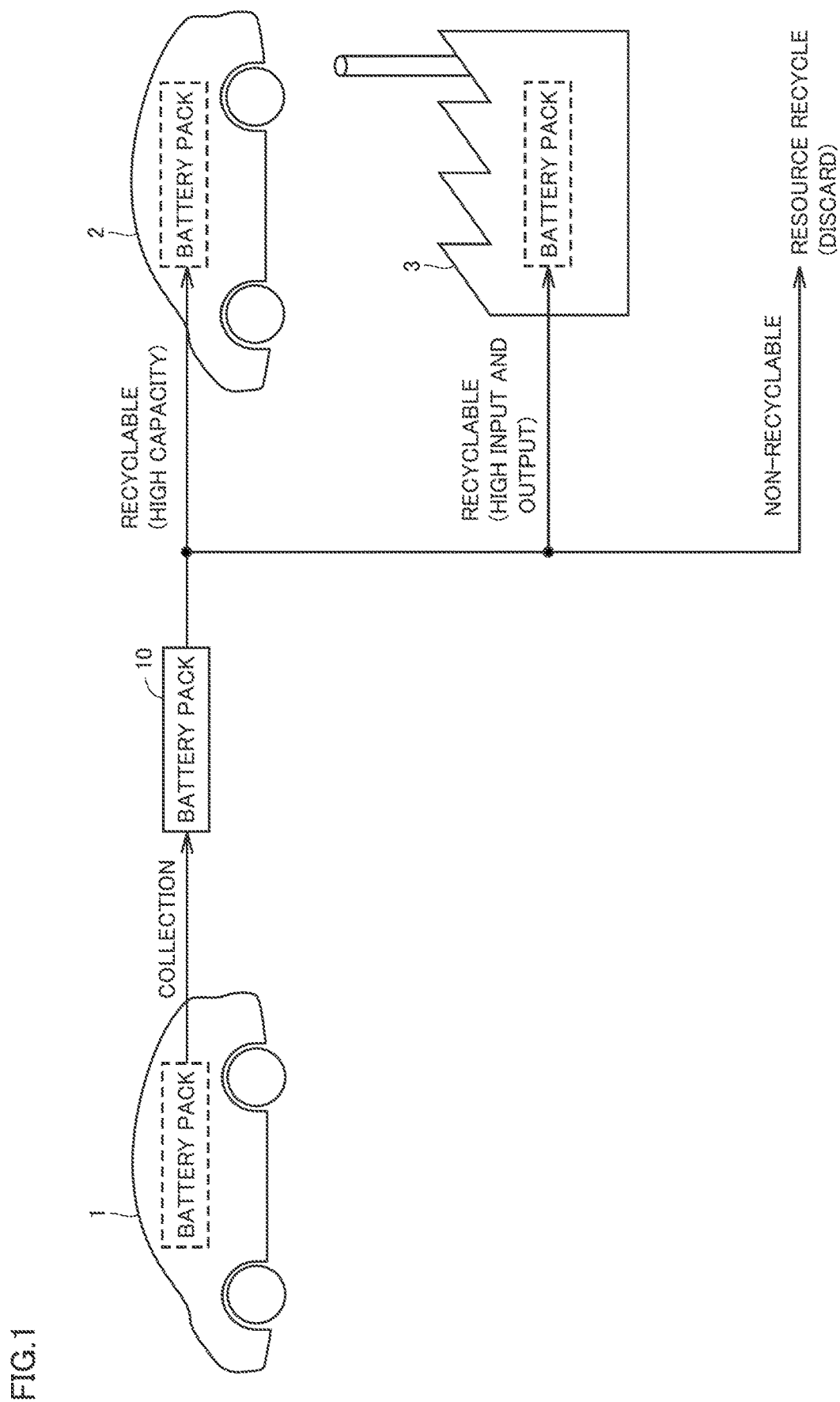
FIG. 1 is a conceptual diagram for illustrating recycle of a battery pack.

An embodiment of the present disclosure will be described below in detail with reference to the drawings. The same or corresponding elements in the drawings have the same reference characters allotted and description thereof will not be repeated. In general, "recycle" of a battery pack is broadly categorized into reuse, rebuild, and resource recycle. In the case of reuse, collected battery packs are subjected to necessary shipment inspection and shipped as they are as reused products. In the case of rebuild, collected battery packs are once disassembled to cells (single cells). Then, among the cells, cells which can be used as they are are combined to manufacture a new battery pack. Newly manufactured battery packs are subjected to shipment inspection and shipped as rebuilt products. In resource recycle, resource-recyclable materials are taken out of each cell and collected battery packs are not used as other battery packs. In the present disclosure, recyclable battery packs comprehensively mean battery packs which can be reused or rebuilt. Battery packs which are non-recyclable mean battery packs from which resources should be recycled (or which should be discarded).

First Embodiment

FIG. 1 is a conceptual diagram for illustrating recycle of a battery pack.

Referring to FIG. 1, in markets, a battery pack 10 mounted on a vehicle 1 is collected. Vehicle 1 is, for example, a hybrid vehicle. Sources from which battery packs 10 are to be collected, however, are not limited to vehicles, and stationary battery packs may be collected for recycle.

Figure 2:
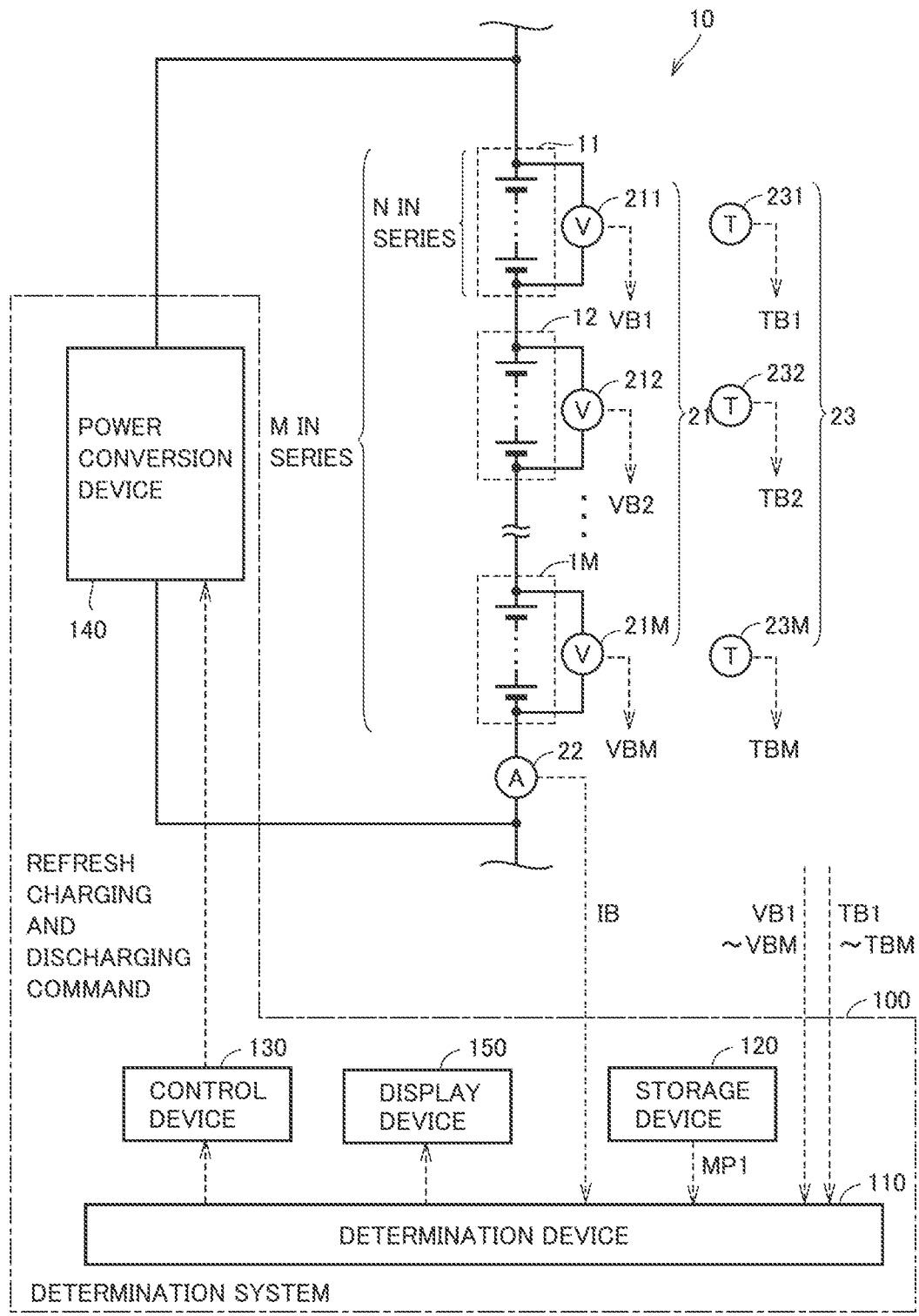
FIG. 2 is a configuration diagram of a battery pack and a secondary battery system according to a first embodiment.

In a first embodiment, collected battery packs 10 are subjected to prescribed treatment, and whether or not treated battery packs 10 are recyclable and an application in recycle are determined by a determination system 100 (see FIG. 2). Battery packs determined as non-recyclable (not suitable for recycle) are subjected to resource recycle or discarded. Battery packs determined as recyclable (suitable for recycle) are subjected to further determination as to whether they are suitable for a high-capacity application or a high input-and-output application.

Battery packs 10 determined as suitable for a high-capacity application are subjected to treatment for recovering a capacity of battery packs 10 (refresh charging treatment), and thereafter mounted, for example, on another vehicle 2 (for example, a hybrid vehicle) and recycled. By mounting high-capacity battery pack 10 on vehicle 2, fuel efficiency of vehicle 2 can be improved or drivability of vehicle 2 can be enhanced. A vehicle-mounted application is not limited to an application for standard-sized vehicles but also includes an application for large-sized vehicles such as buses and trucks and an application for two-wheel vehicles (motor bicycles and electric bicycles).

Battery packs determined as suitable for a high input-and-output application are subjected to refresh charging treatment and thereafter recycled, for example, as battery packs for electric power regulation in an electric power supply facility 3 such as a power station. The high input-and-output application may include electric power regulation in a facility (not shown) such as a factory, an office building, a hospital, a house, or a store. Details of the high input-and-output application will be described later.

<Configuration of Determination System>

FIG. 2 is a configuration diagram of a battery pack and a determination system (a secondary battery system) according to the first embodiment. Referring to FIGS. 1 and 2, in the first embodiment, a configuration in which vehicle 1 is a hybrid vehicle and battery pack 10 and determination system 100 are mounted on vehicle 1 (an on-board configuration) will be described by way of example. Vehicle 1 may be another electrically powered vehicle (specifically, a plug-in hybrid vehicle, an electric vehicle, or a fuel cell vehicle).

Battery pack 10 includes, for example, M modules 11 to 1M connected in series. Each module includes, for example, N cells connected in series. M and N are natural numbers not smaller than two. In the present embodiment, each cell is a cell of a nickel metal hydride battery. A type of the cell is not limited to the nickel metal hydride battery. The cell should only be an alkaline secondary battery containing a nickel-based compound (nickel hydroxide) as a positive electrode active material, and may be, for example, a nickel-zinc battery.

Battery pack 10 is provided, for example, with M voltage sensors 211 to 21M, a current sensor 22, and M temperature sensors 231 to 23M. Voltage sensors 211 to 21M are provided in correspondence with M modules, respectively, and the voltage sensor detects a voltage across terminals (a voltage $VBi$) (i being any natural number from 1 to M) of a corresponding module. Current sensor 22 detects a charging and discharging current (a current IB) of battery pack 10. Temperature sensors 231 to 23M are provided in correspondence with M modules, respectively, and the temperature sensor detects a temperature (a temperature $TBj$) (j being any natural number from 1 to M) of a corresponding module. Each sensor outputs a signal indicating a result of detection to determination system 100. It is not essential to monitor a voltage and a temperature for each module, and a voltage and a temperature may be monitored, for example, for each cell.

Though M and N have been described as natural numbers not smaller than two, a module configuration and a cell configuration in battery pack 10 are not particularly limited in the present disclosure. Unless a specific module among M modules or a specific cell among N cells is mentioned in connection with a voltage and a temperature, an expression simply as a voltage and a temperature of battery pack 10 is also provided. This is also applicable to other parameters such as an amount of generation of $Ni_2O_3H$ and a full charge capacity which will be described later.

Determination system 100 includes a determination device 110, a storage device 120, a control device 130, a power conversion device 140, and a display device 150. Each of determination device 110 and control device 130 is implemented by a microcomputer including a central processing unit (CPU), a memory, and an input and output interface (none of which is shown).

Determination device 110 performs "recycle determination processing" for determining whether or not battery pack 10 is recyclable and an application in recycle. The recycle determination processing will be described in detail later.

Storage device 120 stores a map MP1 (see FIG. 8) showing relation of a voltage and a temperature of battery pack 10 with an amount of generation of $Ni_2O_3H$ in the positive electrode, although details thereof will be described later. Map MP1 stored in storage device 120 is output to determination device 110.

Control device 130 controls charging and discharging of battery pack 10 by controlling power conversion device 140. Though FIG. 2 shows an example in which determination device 110, storage device 120, and control device 130 are configured separately, any two or three of these devices may integrally be configured.

Power conversion device 140 is configured to have battery pack 10 charged and discharge in accordance with a control command from control device 130. Power conversion device 140 includes, for example, an AC/DC converter and a DC/DC converter (neither of which is shown) and is electrically connected between battery pack 10 and a not-shown motor generator.

Display device 150 is implemented, for example, by a display of a car navigation system, and shows a result of the recycle determination processing by determination device 110. In a configuration in which determination system 100 is not mounted on vehicle 1 (an off-board configuration), display device 150 is implemented, for example, by a display of a computer terminal.

<Determination as to Recycle of Nickel Metal Hydride Battery>

In the positive electrode of battery pack 10, $Ni_2O_3H$ is generated over time. In particular in a high-temperature environment, generation of $Ni_2O_3H$ is noticeable. $Ni_2O_3H$ generated in accordance with a condition of use of battery pack 10 is thus gradually accumulated in the positive electrode. With increase in $Ni_2O_3H$ accumulated in the positive electrode, a full charge capacity of battery pack 10 lowers.

Figure 3:
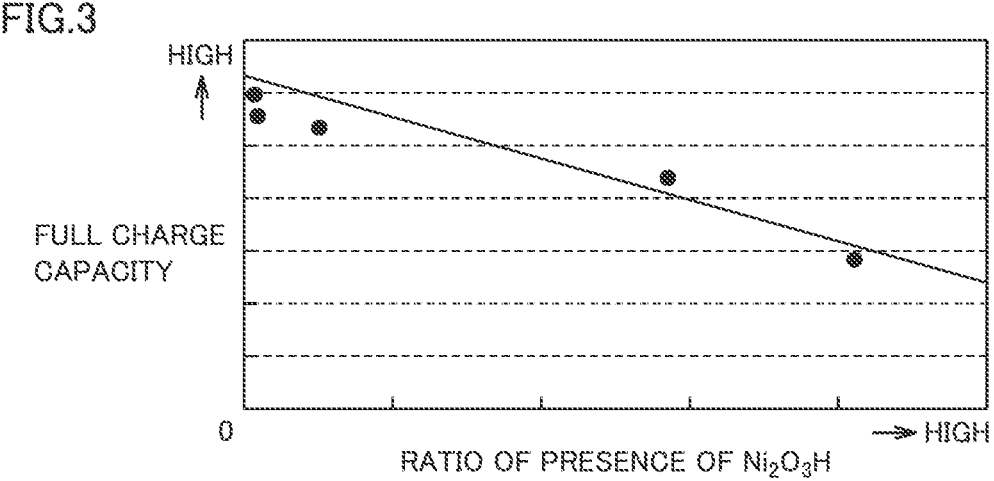
FIG. 3 is a diagram showing one example of results of experiments of relation between a ratio of presence of $Ni_2O_3H$ in a positive electrode and a full charge capacity.

FIG. 3 is a diagram showing one example of results of experiments of relation between a ratio of presence of $Ni_2O_3H$ in the positive electrode and a full charge capacity. Referring to FIG. 3, the abscissa represents a ratio of presence of $Ni_2O_3H$ in the positive electrode and the ordinate represents a full charge capacity of battery pack 10. It can be seen in the results of experiments that the full charge capacity lowers as a ratio of presence of $Ni_2O_3H$ is higher.

As shown in FIG. 3, even though the full charge capacity of battery pack 10 lowers to some extent with increase in amount of generation of $Ni_2O_3H$, battery pack 10 may be recyclable. When an amount of generation of $Ni_2O_3H$ in the positive electrode should newly be measured in determining whether or not battery pack 10 is recyclable, however, the number of man-hours and cost will increase.

Therefore, a configuration below is adopted in the first embodiment. Storage device 120 stores map MP1 (see FIG. 8) showing relation of a voltage and a temperature of battery pack 10 with an amount of generation of $Ni_2O_3H$ in the positive electrode per unit charging time. Determination device 110 estimates an amount of generation of $Ni_2O_3H$ by using a voltage VB and a temperature TB of battery pack 10 as well as map MP1 while battery pack 10 is being used (for example, while the system of vehicle 1 is operating). Determination device 110 determines whether or not battery pack 10 is recyclable based on the estimated amount of $Ni_2O_3H$ generation, and when the battery pack is determined as recyclable, the determination device further determines an application in recycle.

<Creation of Map MP1>

Map MP1 is created in advance through a plurality of experiments. A method of creating map MP1 will initially be described below, and the recycle determination processing with the use of map MP1 will subsequently be described.

Experiments for creating map MP1 are conducted, for example, in the following sequence. Initially, an experiment for examining relation between an amount of introduction of $Ni_2O_3H$ into the positive electrode and a ratio of an area of a peak found in analysis of the positive electrode with an X-ray diffraction method (which is also hereinafter referred to as a "first preliminary experiment") is conducted. Thereafter, an experiment for examining relation between a durability condition (a voltage and a temperature) and an amount of generation of $Ni_2O_3H$ in the positive electrode by using a nickel metal hydride battery subjected to a durability test (which will be described later) and results in the first preliminary experiment (the experiment being hereinafter also referred to as a "second preliminary experiment") is conducted. In the second preliminary experiment, finally, map MP1 showing relation between a durability condition and an amount of generation of $Ni_2O_3H$ in the nickel metal hydride battery per unit time is created. The first and second preliminary experiments will sequentially be described below.

<First Preliminary Experiment>

Figure 4:
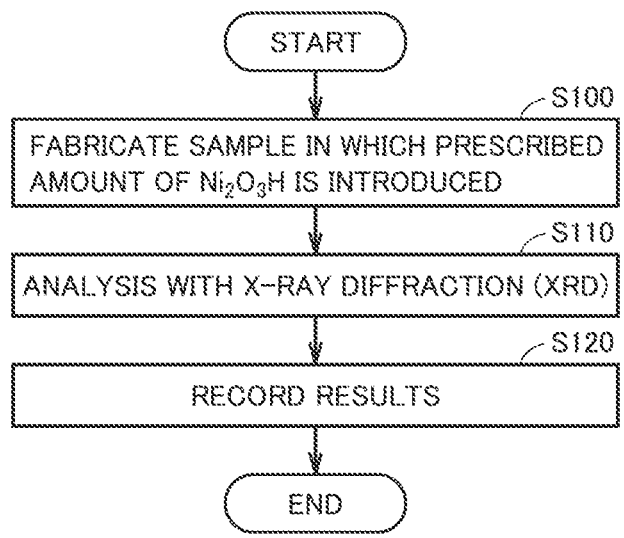
FIG. 4 is a flowchart showing a processing procedure in a first preliminary experiment.

FIG. 4 is a flowchart showing a processing procedure in the first preliminary experiment. Processing shown in FIG. 4 and flowcharts showing processing procedures in second and third preliminary experiments which will be described later (see FIGS. 7 and 14) is performed by an experimenter.

Referring to FIG. 4, in S100, the experimenter fabricates a sample by uniformly mixing a prescribed amount of $Ni_2O_3H$ powders (for example, at a ratio P1 of $Ni_2O_3H$ in the sample) into new positive electrode powders. Thereafter, the experimenter analyzes the sample with the X-ray diffraction method (S110). Specifically, the experimenter measures an area of a peak of X-rays at a predetermined angle of diffraction. How to set an angle of diffraction of X-rays will be described next.

Figure 5:
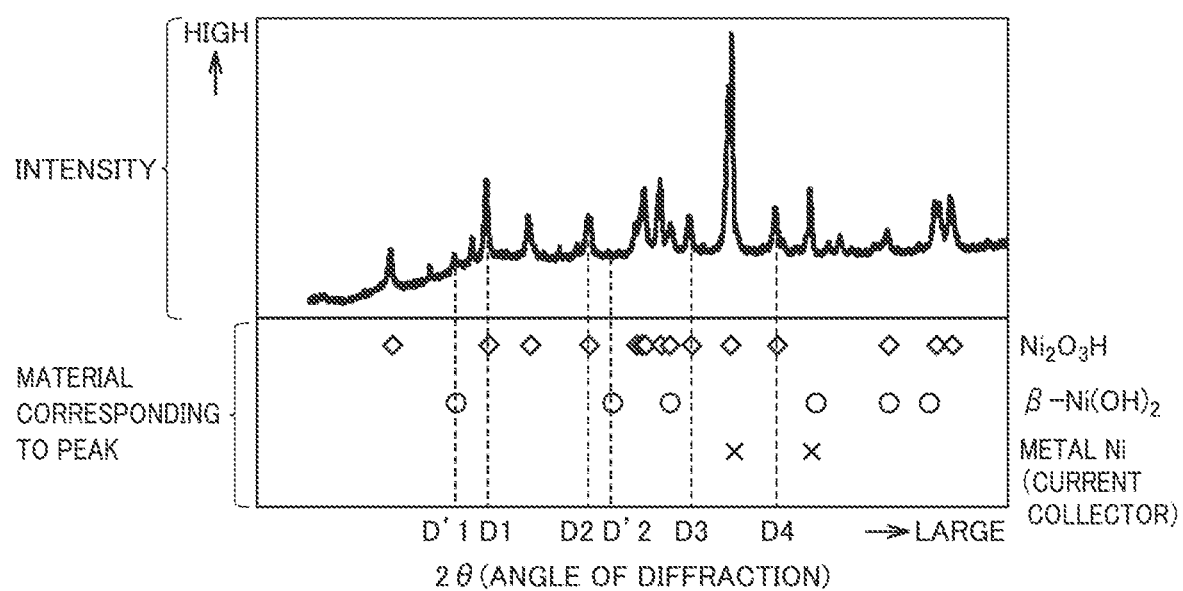
FIG. 5 is a diagram showing one example of results of analysis of a positive electrode with an X-ray diffraction method after a large amount of $Ni_2O_3H$ is intentionally introduced into the positive electrode.

FIG. 5 is a diagram showing one example of results (a diffraction pattern) of analysis of the positive electrode with the X-ray diffraction method after a large amount of $Ni_2O_3H$ is intentionally mixed into the positive electrode. Referring to FIG. 5, the abscissa represents an angle of diffraction (2θ) and the ordinate represents intensity of diffraction. When the positive electrode containing the large amount of $Ni_2O_3H$ is completely discharged, the positive electrode may contain $Ni_2O_3H$, $\beta$-$Ni(OH)_2$, and a metal Ni (a current collector). When the positive electrode is not completely discharged, $\beta$-NiOOH may also be contained.

A diffraction peak at an angle of diffraction corresponding to a position marked with "◇" in the figure includes influence by diffraction caused by $Ni_2O_3H$. A diffraction peak at an angle of diffraction corresponding to a position marked with "○" includes influence by diffraction caused by $\beta$-$Ni(OH)_2$. A diffraction peak at an angle of diffraction corresponding to a position marked with "×" includes influence by diffraction caused by the metal Ni.

For example, peaks at angles of diffraction D1 to D4 are mainly affected by diffraction caused by $Ni_2O_3H$ and hardly affected by diffraction caused by other compounds. Therefore, the experimenter can measure an area of a peak caused by $Ni_2O_3H$ by using X-rays at any of angles of diffraction D1 to D4. In the first embodiment, by way of example, the area of the peak at angle of diffraction D1 is used for analysis with the X-ray diffraction method. For example, areas of the peaks at all angles of diffraction D1 to D4 (a total area of four peaks) may be used for analysis with the X-ray diffraction method.

Referring again to FIG. 4, when a sample is analyzed with the X-ray diffraction method in S110, the experimenter records the area of the peak at angle of diffraction D1 which represents a result of analysis (S120). As set forth above, an area of a peak at angle of diffraction D1 when a prescribed amount of $Ni_2O_3H$ (for example, at ratio P1) has been introduced into the sample is found through processing in S100 to S120.

Attention is now paid to peaks (for example, D'1 and D'2 shown in FIG. 5) attributed to $Ni(OH)_2$ similarly to $Ni_2O_3H$, and an area of a peak at angle of diffraction D'1 at the time when a prescribed amount (K1) of $Ni_2O_3H$ has been introduced is calculated.

In the first preliminary experiment, processing in S100 to S120 is performed a plurality of times with an amount of $Ni_2O_3H$ to be introduced into the sample being varied (for example, varied to a prescribed amount K2 or K3). Consequently, relation between a ratio of $Ni_2O_3H$ in the sample (=amount of $Ni_2O_3H$/(amount of $Ni(OH)_2$+amount of $Ni_2O_3H$)) and a ratio of an area of a peak at angle of diffraction D1 (=D1/(D1+D'1)) can be found.

Figure 6:
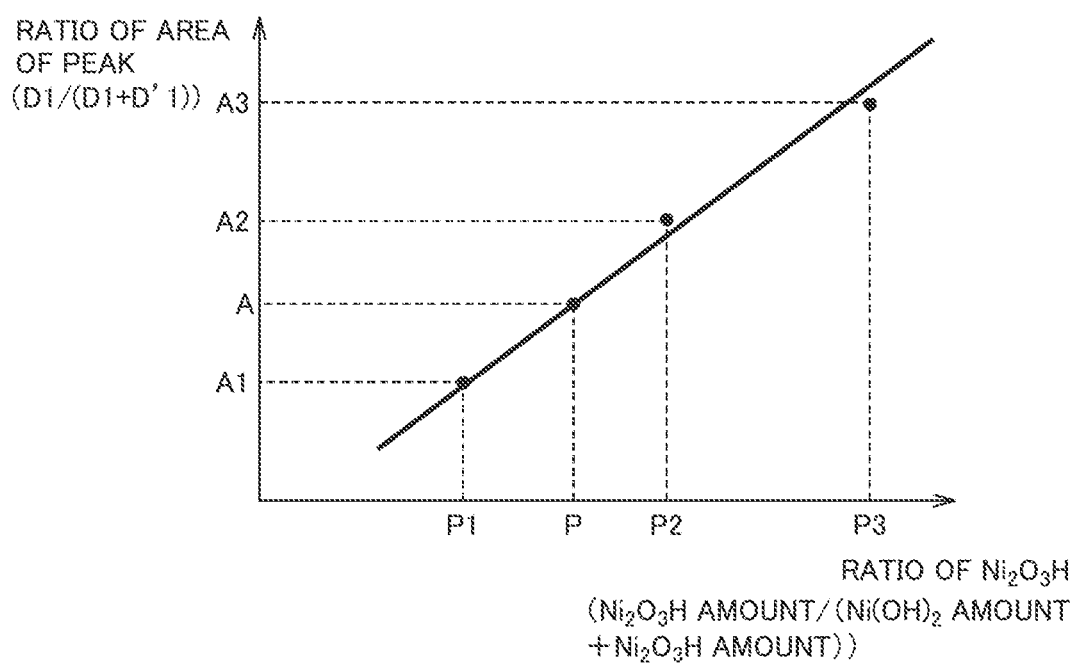
FIG. 6 is a diagram showing one example of relation between a ratio of $Ni_2O_3H$ in a sample and a ratio of an area of a peak found with the X-ray diffraction method through the first preliminary experiment.

FIG. 6 is a diagram showing one example of relation between a ratio of $Ni_2O_3H$ in a sample and a ratio of an area of a peak found with the X-ray diffraction method through the first preliminary experiment. Referring to FIG. 6, the abscissa represents a ratio of $Ni_2O_3H$ in the sample and the ordinate represents a ratio of an area of a peak found with the X-ray diffraction method.

Such a situation that when $Ni_2O_3H$ is introduced into samples at ratios P1 to P3, ratios of areas of peaks at angle of diffraction D1 attain to A1 to A3, respectively, is assumed. Based on results of this experiment, for example, relation shown in FIG. 6 can be found as relation between a ratio of $Ni_2O_3H$ in the sample and the ratio of the area of the peak at angle of diffraction D1. The first preliminary experiment ends when relation between a ratio of $Ni_2O_3H$ in the sample and a ratio of an area of a peak at angle of diffraction D1 is found. Though relation in FIG. 6 is defined based on an area of a peak, relation in FIG. 6 may be defined, for example, based on peak intensity.

<Second Preliminary Experiment>

Figure 7:
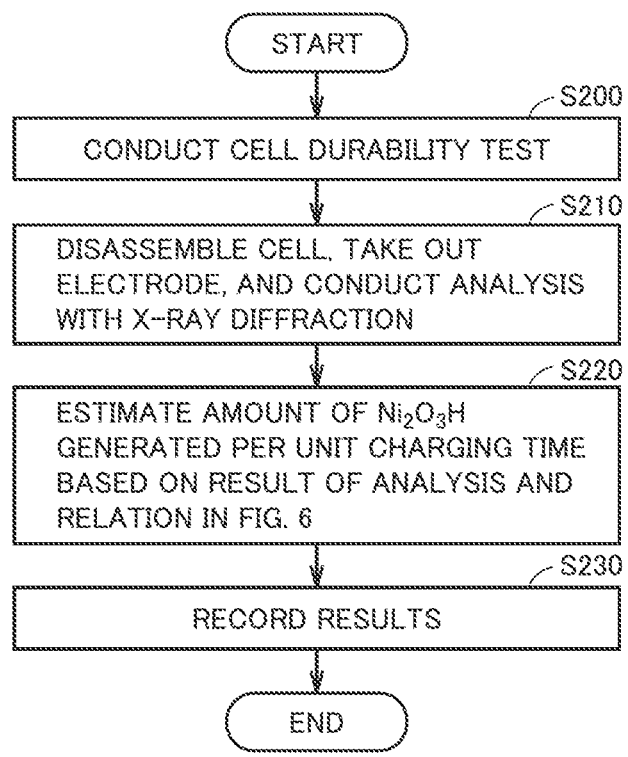
FIG. 7 is a flowchart showing a processing procedure in a second preliminary experiment.

FIG. 7 is a flowchart showing a processing procedure in a second preliminary experiment. Referring to FIG. 7, the experimenter sets a durability condition (a voltage condition and a temperature condition) and conducts a durability test of any cell taken out of new battery pack 10 (S200). For example, in the durability test, the cell is set in a charging system provided in a thermostatic chamber (neither of which is shown). A temperature in the thermostatic chamber is maintained at a temperature set by the experimenter. The cell is charged at a constant voltage. Of the constant voltage, a voltage increment derived from a metal resistance is considered as not contributing to generation of $Ni_2O_3H$ in the positive electrode of the cell.

The durability test is conducted, for example, by repeating charging for a prescribed period of time and discharging for a prescribed period of time such that a state of charge (SOC) of the cell is accommodated within a prescribed range. The prescribed range of the SOC refers, for example, to a controlled range in which the SOC is controlled in determination system 100 (for example, a range from 50% to 80%). The durability test is conducted, for example, for several days to several months in total.

When the durability test ends, the experimenter disassembles the cell, takes out the positive electrode, and conducts analysis with the X-ray diffraction method (S210). Thereafter, the experimenter estimates an amount of generation of $Ni_2O_3H$ in the cell per unit charging time based on relation between a ratio of $Ni_2O_3$ in an electrode and a ratio of an area of a peak found with the X-ray diffraction method (the relation shown in FIG. 6 which is derived in the first preliminary experiment) and the ratio of the area of the peak representing results of analysis (S220).

For example, when the area of the peak is denoted as A, a ratio of generation of $Ni_2O_3H$ (a ratio of $Ni_2O_3H$ in the positive electrode) is estimated as P (see FIG. 6). An amount of generation of $Ni_2O_3H$ per unit charging time can be calculated by dividing the amount of generation of $Ni_2O_3H$ which can be calculated based on estimated ratio P of $Ni_2O_3H$ by a total time period of charging in the durability test. The unit time is set, for example, to one second. The reason why the amount of generation is divided not by a duration of the durability test but by the total time period for charging in the durability test is that $Ni_2O_3H$ is considered as not being generated unless a voltage high to some extent is applied to the nickel metal hydride battery (more generally, an alkaline secondary battery containing a nickel compound as the positive electrode active material) and it is less likely to be generated during discharging.

Thereafter, the experimenter records as results at the voltage and the temperature of the cell derived from the set durability condition, the amount of generation of $Ni_2O_3H$ per unit charging time estimated in S220 (S230). As set forth above, an amount of generation of $Ni_2O_3H$ in each cell per unit charging time under the set durability condition is found through the processing in S200 to S230.

In the second preliminary experiment, the processing in S200 to S230 is performed a plurality of times with durability conditions being varied. Consequently, relation of a voltage and a temperature of a cell with an amount of generation of $Ni_2O_3H$ in the positive electrode of the cell per unit charging time can be found. The second preliminary experiment thus ends.

Figure 8:
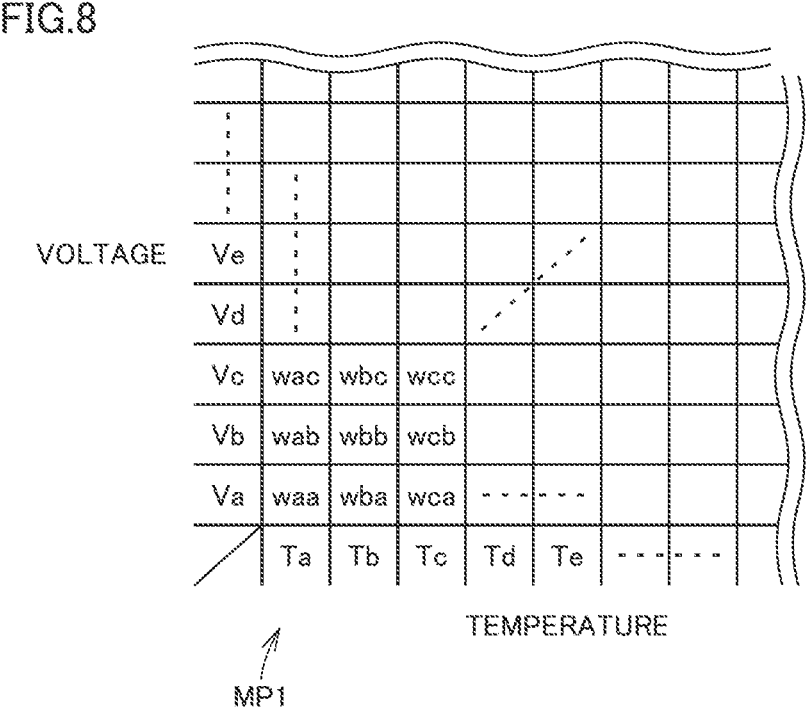
FIG. 8 is a diagram showing one example of a map in which results obtained through the first and second preliminary experiments are summarized.

FIG. 8 is a diagram showing one example of map MP1 in which results obtained through the first and second preliminary experiments are summarized. Referring to FIG. 8, the abscissa represents a temperature as a durability condition and the ordinate represents a voltage as a durability condition.

In map MP1, for each combination of a temperature (Ta, Tb, Tc, . . . ) and a voltage (Va, Vb, Vc, . . . ) of a module, an amount of generation (waa, wab, wba, . . . ) of $Ni_2O_3H$ in the module per unit charging time is brought in correspondence. A voltage is set to a value resulting from exclusion of a voltage increment derived from a metal resistance from a voltage detected by the voltage sensor. An amount of generation of $Ni_2O_3H$ per unit charging time represents a result obtained through the second preliminary experiment (conversion of a result of measurement in a cell into a value in a module). In determination system 100 according to the first embodiment, map MP1 is created in advance through the first and second preliminary experiments, and created map MP1 is stored in storage device 120. A procedure for determining whether or not battery pack 10 is recyclable and an application in recycle based on map MP1 will be described below.

<Characteristics Like Capacitor>

As a result of experiments conducted by the present inventors, it has been found that a full charge capacity lowers in battery pack 10 in which an amount of generation of $Ni_2O_3H$ has increased whereas such battery pack 10 is suitable for use in a capacitor application.

Figure 9:
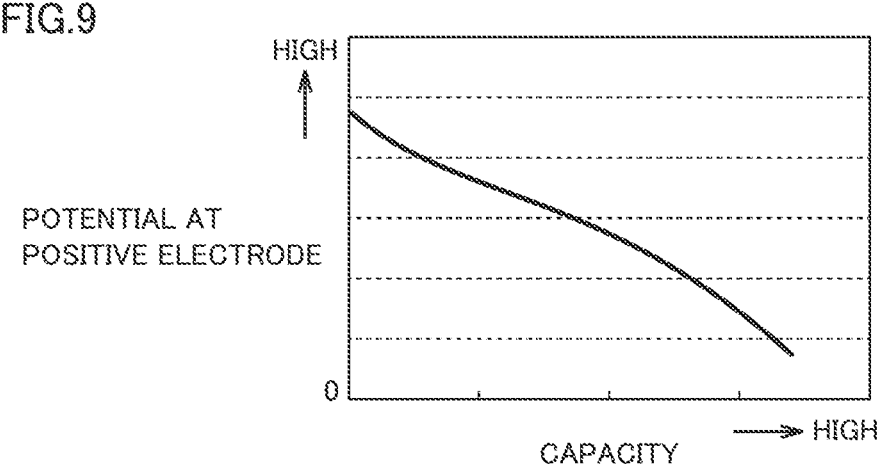
FIG. 9 is a diagram showing one example of discharge characteristics of a cell in which an amount of generation of $Ni_2O_3H$ has increased.

FIG. 9 is a diagram showing one example of discharge characteristics of a cell in which an amount of generation of $Ni_2O_3H$ has increased. In FIG. 9, the abscissa represents a capacity of a cell and the ordinate represents a potential at the positive electrode of the cell. Referring to FIG. 9, it can be seen that, though the potential at the positive electrode of the cell lowers with discharging, relation between the capacity and the potential in the positive electrode is linear. This fact shows that relation of $Q=C\Delta V$ is satisfied between an amount of charges Q released from the cell, a capacitance C of the cell, and variation in voltage $\Delta V$ of the cell. Namely, it can be seen that the cell in which an amount of generation of $Ni_2O_3H$ has increased exhibits characteristics like a capacitor.

In general, input-and-output characteristics of a secondary battery are temperature-dependent, and electric power which can be charged (input) to the secondary battery and electric power which can be discharged (output) from the secondary battery are less in a low-temperature environment than in a room-temperature environment.

Figure 10:
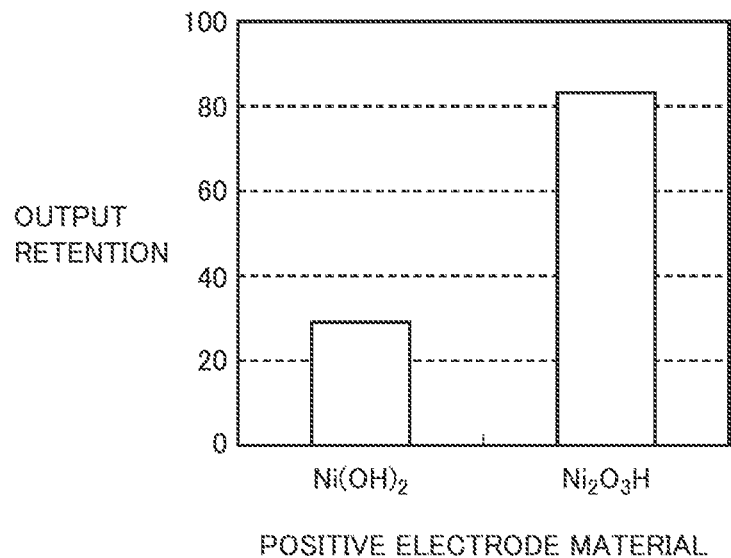
FIG. 10 is a diagram showing one example of an output retention with respect to variation in temperature in a cell in which an amount of generation of $Ni_2O_3H$ has increased.

FIG. 10 is a diagram showing one example of an output retention with respect to variation in temperature in a cell in which an amount of generation of $Ni_2O_3H$ has increased. FIG. 10 shows a ratio of discharged electric power (an output retention) at a low temperature ($-10°$ C.) with discharged electric power at a room temperature ($25°$ C.) being defined as the reference for a cell of which positive electrode is composed of $Ni(OH)_2$ and a cell of which positive electrode is composed of $Ni_2O_3H$. In FIG. 10, when the positive electrode is composed of $Ni(OH)_2$, the output retention lowers to approximately 30%, whereas when the positive electrode is composed of $Ni_2O_3H$, the output retention higher than 80% is maintained. It can thus be seen also based on lower temperature dependency of the output retention than in the example where the positive electrode is composed of $Ni(OH)_2$ that the cell in which an amount of generation of $Ni_2O_3H$ has increased exhibits characteristics like a capacitor.

When an amount of generation of $Ni_2O_3H$ increases with use, a full charge capacity of battery pack 10 lowers. In a vehicle-mounted application (an application for hybrid vehicles), lowering in full charge capacity of battery pack 10 leads to poorer fuel efficiency or poorer drivability and hence the full charge capacity is one of important properties. On the other hand, high importance is not placed on a high full charge capacity (an amount of electric power which can be stored). Rather, there are also applications where other properties such as high input-and-output characteristics (see FIG. 9) and temperature characteristics of an input and output retention (see FIG. 10) are more important. Examples of such applications include a spare power supply for electric power regulation in an electric power supply facility such as a power station.

Figure 11:
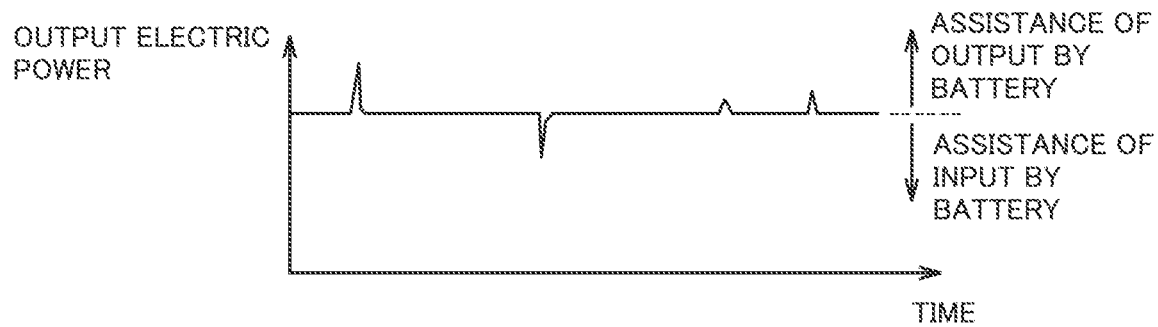
FIG. 11 is a schematic diagram for illustrating supply and demand of electric power in an electric power supply facility.

FIG. 11 is a schematic diagram for illustrating supply and demand of electric power in an electric power supply facility. In FIG. 11, the abscissa represents elapsed time and the ordinate represents electric power output from an electric power supply facility. In the electric power supply facility, as shown in FIG. 11, with sudden fluctuation in demand for electric power, output electric power may abruptly increase or decrease. By providing battery pack 10 (or a battery unit including a plurality of battery packs 10 as being combined) which has high input-and-output characteristics with increase in amount of generation of $Ni_2O_3H$ and using the battery pack like a capacitor, fluctuation in demand for electric power can be addressed. By providing battery pack 10, input to and output from the electric power supply facility can be assisted.

Though a power station has been given as an example of the electric power supply facility, the electric power supply facility should only be a facility where a request for high input and output may intermittently be issued in a short period of time. The electric power supply facility may be, for example, a facility which is stationarily provided in a factory, an office building, and a hospital, and provides an emergency power supply when supply of electric power from a main power supply (an external power generation facility) is unstable (for example, power failure including power interruption).

<Recycle Determination Processing>

In determination system 100 according to the first embodiment, an amount of generation of $Ni_2O_3H$ is estimated while battery pack 10 is being used (while a vehicle system is operating, for example, while vehicle 1 is running). Whether or not battery pack 10 is recyclable is determined based on the estimated amount of generation of $Ni_2O_3H$. Therefore, determination system 100 can readily determine whether or not battery pack 10 is recyclable based on an amount of generation of $Ni_2O_3H$ estimated while battery pack 10 is being used, without newly measuring an amount of generation of $Ni_2O_3H$ at the time of making determination as to recyclability.

Figure 12:
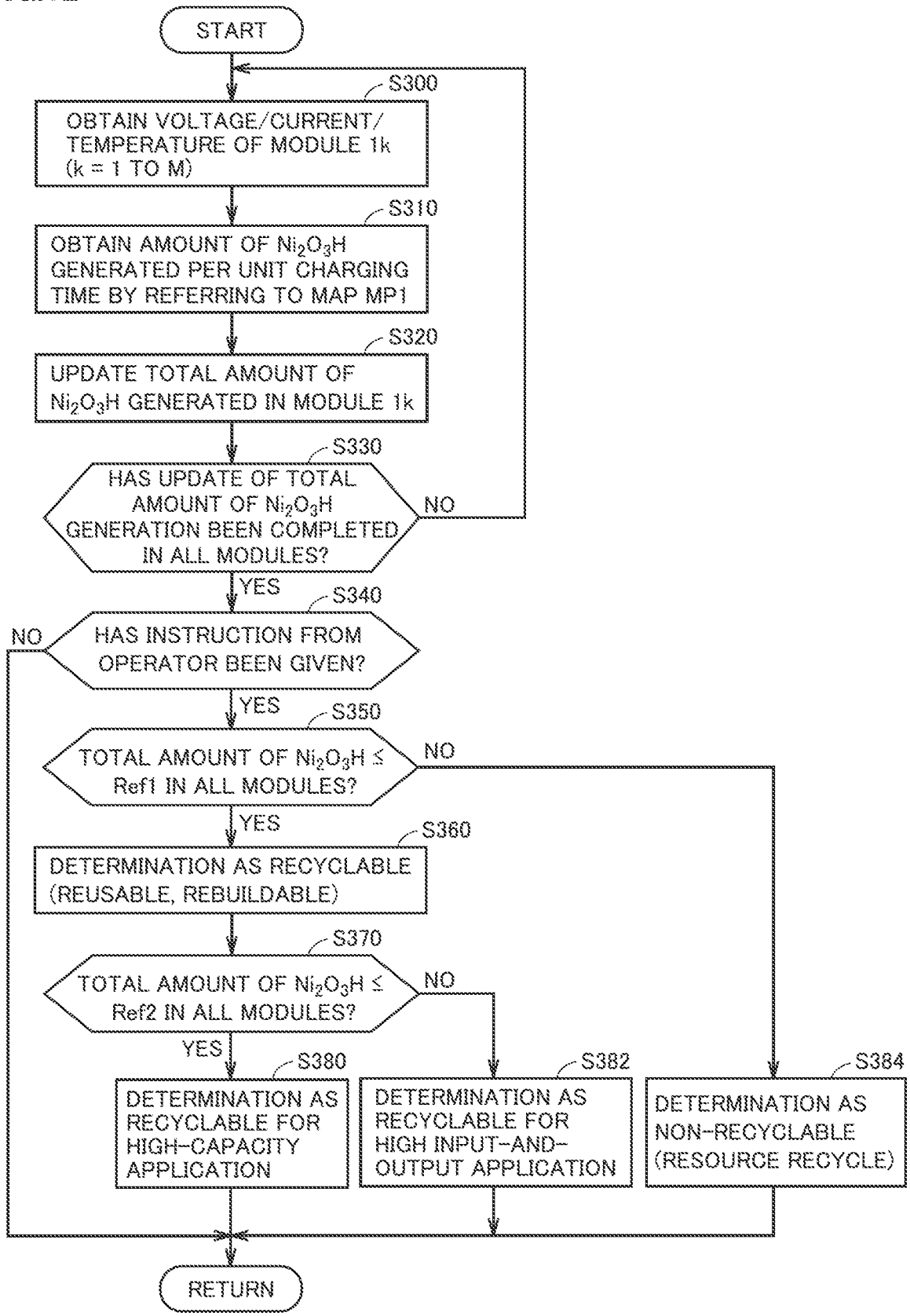
FIG. 12 is a flowchart showing a processing procedure for making determination as to recycle of a battery pack in the first embodiment.

FIG. 12 is a flowchart showing a processing procedure for making determination as to recycle of a battery pack in the first embodiment. Flowcharts shown in FIG. 12 and FIG. 16 which will be described later are called from a main routine (not shown) when a prescribed condition is satisfied and repeatedly performed by determination device 110 with a unit time being defined as one cycle. Though each step (which is abbreviated below as "S") included in these flowcharts is basically performed in software processing by determination device 110, it may be performed by dedicated hardware (electrical circuits) fabricated in determination device 110.

Referring to FIGS. 2 and 12, determination device 110 sequentially updates a total amount of generation of $Ni_2O_3H$ in modules 11 to 1M by repeatedly performing processing in S300 to S330. A degree of deterioration caused by $Ni_2O_3H$ in each of modules 11 to 1M is thus recognized. The total amount of generation of $Ni_2O_3H$ estimated one cycle before in each of modules 11 to 1M is stored in storage device 120.

Determination device 110 obtains in S300, for example, signals indicating a voltage VB1, a temperature TB1, and current 1B from voltage sensor 211 and temperature sensor 231 corresponding to module 11 and current sensor 22, respectively. Determination device 110 calculates a voltage resulting from subtraction of a voltage increment derived from a metal resistance from voltage VB1. A voltage corresponding to the voltage increment is calculated based on a metal resistance recognized in advance and current IB.

Determination device 110 obtains information showing an amount of generation of $Ni_2O_3H$ in module 11 per unit charging time which corresponds to the voltage calculated in S300 and temperature TB1 by referring to map MP1 (see FIG. 8) stored in storage device 120 (S310). When the processing is repeated with the unit time being defined as one cycle as described above, an amount of generation of $Ni_2O_3H$ per unit time is equal to an amount of generation of $Ni_2O_3H$ per one cycle. Therefore, determination device 110 updates the total amount of generation of $Ni_2O_3H$ in module 11 by adding the amount of generation of $Ni_2O_3H$ calculated in S310 to the total amount of generation of $Ni_2O_3H$ one cycle before which is stored in storage device 120 (S320).

Thereafter, determination device 110 determines whether or not the total amount of generation of $Ni_2O_3H$ has been updated in all modules 11 to 1M (S330). When the total amount of generation of $Ni_2O_3H$ in any module has not been updated (NO in S330), the process returns to S300 and the process is continued for a module of which total amount of generation of $Ni_2O_3H$ has not been updated.

When the total amount of generation of $Ni_2O_3H$ has been updated in all modules 11 to 1M (YES in S330), determination device 110 determines whether or not it has received an instruction to make determination as to recycle of battery pack 10 from an operator (for example, a dealer or an operator of battery pack recycle business) through an operation portion (not shown) (S340). When the determination device has not received an instruction (NO in S340), the process returns to the main routine.

When it is determined that an instruction from the operator has been received (YES in S340), determination device 110 determines whether or not the total amount of generation of $Ni_2O_3H$ is greater than a prescribed reference amount Ref1 in each of modules 11 to 1M (S350). Reference amount Ref1 represents a total amount of generation of $Ni_2O_3H$ when a module has a minimum full charge capacity sufficient to be recycled (reused or rebuilt).

When the total amount of generation of $Ni_2O_3H$ is greater than reference amount Ref1 in any of modules 11 to 1M (NO in S350), determination device 110 determines that battery pack 10 is not recyclable (reusable or rebuildable) (not suitable for recycle) (S384).

When the total amount of generation of $Ni_2O_3H$ is equal to or smaller than reference amount Ref1 in all modules 11 to 1M (YES in S350), determination device 110 determines that battery pack 10 is recyclable (S360). Determination device 110 further determines whether or not the total amount of generation of $Ni_2O_3H$ is equal to or smaller than a prescribed reference amount Ref2 in each of modules 11 to 1M (S370).

Reference amount Ref2 is smaller than reference amount Ref1 (Ref2<Ref1) and can be determined as below. When a total amount of generation of $Ni_2O_3H$ in a certain module is equal to or smaller than reference amount Ref2, that module has a full charge capacity sufficient for recycle in a high-capacity application. When a total amount of generation of $Ni_2O_3H$ in a certain module is greater than reference amount Ref2 and equal to or smaller than reference amount Ref1, that module has input-and-output characteristics suitable for recycle in a high input-and-output application. For example, reference amount Ref1 is more preferably set as a value at which a spike of output electric power as shown in FIG. 11 can be accommodated. For a high-capacity application, reference amount Ref2 is preferably determined in consideration of fuel efficiency or drivability.

When the total amount of generation of $Ni_2O_3H$ is equal to or smaller than reference amount Ref2 in all modules 11 to 1M (YES in S370), determination device 110 determines that battery pack 10 is recyclable in a high-capacity application (suitable for recycle in a high-capacity application) (S380).

In contrast, when the total amount of generation of $Ni_2O_3H$ is greater than reference amount Ref2 in at least one of modules 11 to 1M (NO in S370), that is, when the total amount of generation of $Ni_2O_3H$ is greater than reference amount Ref2 and equal to or smaller than reference amount Ref1, determination device 110 determines that battery pack 10 is suitable for recycle in a high input-and-output application (S382).

Results of determination in S380 to S384 are shown on display device 150. For example, in S382, information indicating in which module the total amount of generation of $Ni_2O_3H$ is greater than reference amount Ref2 is shown on display device 150. For example, in S380, information indicating the total amount of generation of $Ni_2O_3H$ in each module is shown on display device 150. Thus, the operator can check results in processing for making determination as to recycle of battery pack 10 and can take appropriate measures.

Refresh charging of battery pack 10 may be performed by using a not-shown charging system after the processing in S380 and S382. Thus, a memory effect which has occurred in battery pack 10 (lowering in voltage due to the memory effect) can be dissolved (or mitigated). Since solution of the memory effect through refresh charging has been known, for example, as in Japanese Patent Laying-Open No. 8-223812, Japanese Patent Laying-Open No. 2001-186682, or Japanese Patent Laying-Open No. 2015-80291, detailed description will not be repeated. As set forth above, in determination system 100 according to the first embodiment, determination device 110 estimates the total amount of generation of $Ni_2O_3H$ for each module while battery pack 10 is being used (see S300 to S330). Determination device 110 determines whether or not battery pack 10 is recyclable based on the estimated total amount of generation (see S350). According to determination system 100, whether or not battery pack 10 is recyclable can readily be determined based on the already estimated total amount of generation of $Ni_2O_3H$ without newly measuring the total amount of generation of $Ni_2O_3H$ at the time of determining recyclabiltiy of battery pack 10.

Determination device 110 further determines whether battery pack 10 determined as recyclable is suitable for a high-capacity application or a high input-and-output application (see S370, S380, and S382). Thus, battery pack 10 determined as recyclable can be made effective use of. In particular, by recycling battery pack 10 including a module greater in total amount of generation of $Ni_2O_3H$ than reference amount Ref2 (a module in which the total amount of generation of $Ni_2O_3H$ is intermediate between reference amount Ref2 and reference amount Ref1) for an electric power supply facility where high input-and-output requests may intermittently be issued in a short period of time, high input-and-output characteristics can be exploited while influence by lowering in full charge capacity due to generation of $Ni_2O_3H$ is lessened.

FIG. 12 illustrates by way of example, a configuration for determining recyclability and an application in recycle for each module, because a degree of deterioration may vary for each module due to variation in temperature in battery pack 10. Recyclability, however, does not have to be determined for each module. For example, a degree of deterioration of battery pack 10 as a whole may be calculated. In contrast, recyclability and an application may be determined for each unit smaller than a module (for example, for each cell).

<Rebuild of Battery Pack>

Though a processing procedure for reuse of battery pack 10 is described in the flowchart shown in FIG. 12, battery pack 10 may be rebuilt.

Figure 13:
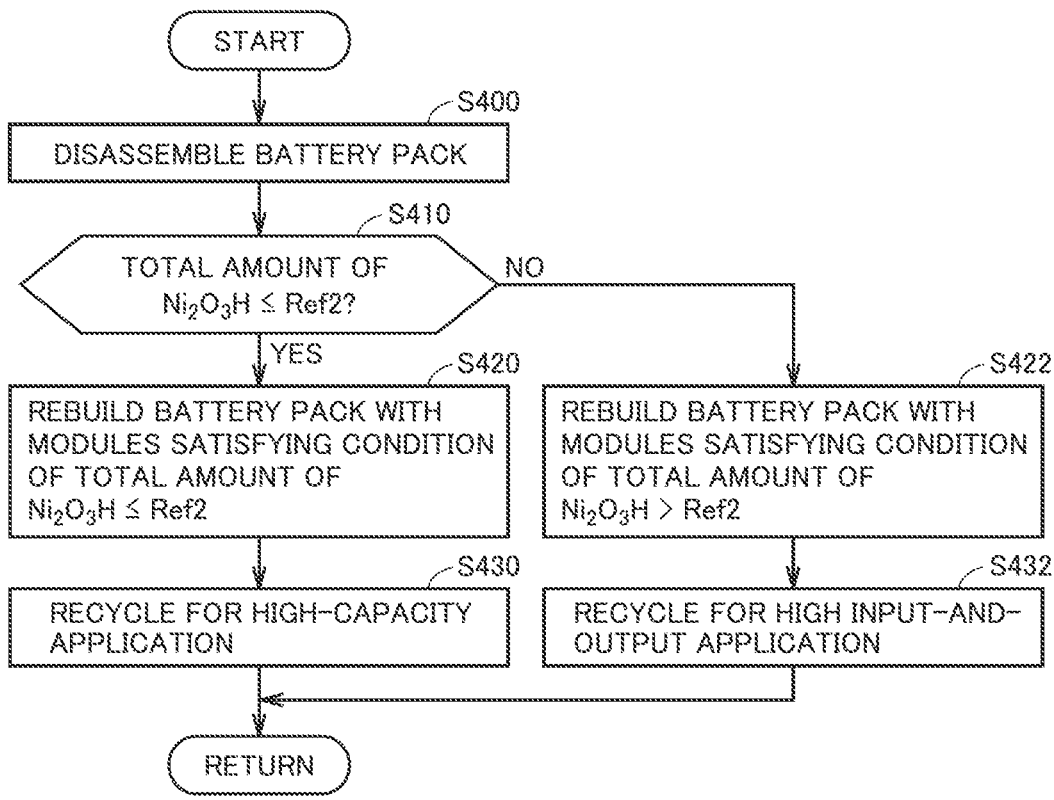
FIG. 13 is a flowchart showing a processing procedure in rebuilding a battery pack.

FIG. 13 is a flowchart showing a processing procedure in rebuilding battery pack 10. Processing shown in this flowchart is performed by an operator (for example, an operator of battery pack recycle business) for battery pack 10 determined to include a module in which the total amount of generation of $Ni_2O_3H$ is greater than reference amount Ref2 and equal to or smaller than reference amount Ref1 in the processing in S370 in FIG. 12.

In S400, the operator disassembles battery pack 10 including a module in which the total amount of generation of $Ni_2O_3H$ is greater than reference amount Ref2 and equal to or smaller than reference amount Ref1. The operator selects a module in which the total amount of generation of $Ni_2O_3H$ is equal to or smaller than reference amount Ref2 (YES in S410) and builds a new battery pack including only such modules (S420). The battery pack rebuilt as such is recycled for a high-capacity application (S430).

The operator selects a module in which the total amount of generation of $Ni_2O_3H$ is greater than reference amount Ref2 and equal to or smaller than reference amount Ref1 (NO in S410) and rebuilds a battery pack including only such modules (S422). A battery pack rebuilt as such is recycled for a high input-and-output application (S432).

When battery pack 10 is rebuilt as set forth above, collected modules can be recycled more efficiently than in reuse of battery pack 10, although the number of man-hours in rebuilding modules increases. When even only one module in which the total amount of generation of $Ni_2O_3H$ is equal to or smaller than reference amount Ref1 is included in the processing in S350, that battery pack may be disassembled for rebuild.

Second Embodiment

A configuration in which determination as to recyclability of battery pack 10 is made while determination system 100 is mounted on a vehicle (an on-board state) has been described in the first embodiment by way of example. Determination system 100, however, may be provided outside the vehicle (an off-board state). In a second embodiment, an example in which battery packs 10 collected from vehicles 1 and 2 are subjected to recycle determination processing will be described. Since the determination system according to the second embodiment is basically equivalent in configuration to determination system 100 according to the first embodiment (see FIG. 2), description will not be repeated.

In the second embodiment, a map MP2 described below is used instead of map MP1 (see FIG. 8). Map MP2 is created based on results in a third preliminary experiment.

Figure 14:
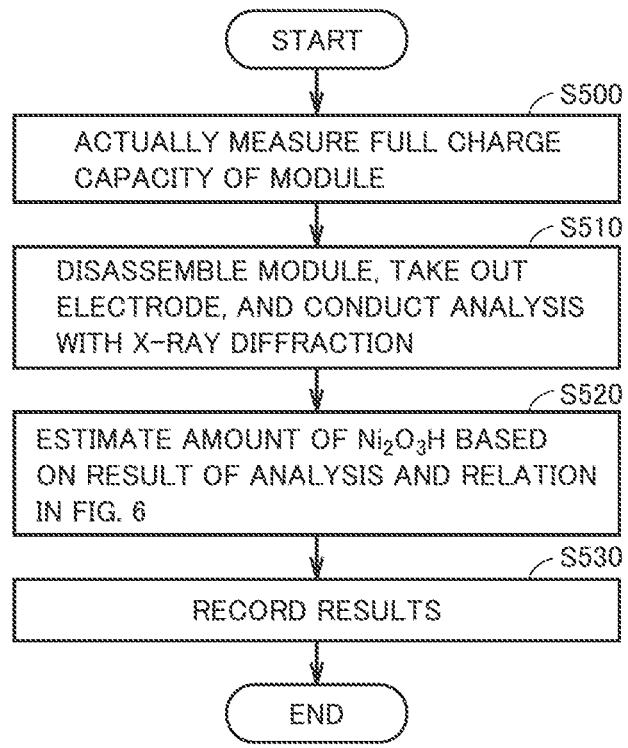
FIG. 14 is a flowchart showing a processing procedure in a third preliminary experiment.

FIG. 14 is a flowchart showing a processing procedure in the third preliminary experiment. Referring to FIG. 14, an experimenter disassembles, for example, battery packs collected form markets, takes out modules, and actually measures a full charge capacity of the modules (S500). More specifically, the experimenter sets the module to a fully charged state (for example, a state that the module is charged to a voltage corresponding to SOC=100%) with the use of a not-shown charging system and discharges the module from that state until a voltage of the module lowers to a prescribed voltage (for example, a voltage corresponding to SOC=0%). The full charge capacity of the module can be calculated by integrating currents associated with this discharging.

The experimenter further disassembles the module of which full charge capacity C has actually been measured and takes out the positive electrode from the module. The experimenter conducts analysis with the X-ray diffraction method (S510). Thereafter, the experimenter estimates an amount W of generation of $Ni_2O_3H$ in the module based on relation between a ratio of $Ni_2O_3H$ in the electrode and a ratio of an area of a peak found with the X-ray diffraction method (the relation shown in FIG. 6 which is derived in the first preliminary experiment) and a ratio of an area of a peak representing results of analysis (S520).

Thereafter, the experimenter records relation between amount W of generation of $Ni_2O_3H$ estimated in S520 and full charge capacity C measured in S500 (S530). In the third preliminary experiment, battery packs used under various conditions are collected and processing in S500 to S530 is performed a plurality of times. Consequently, relation between amount W of generation of $Ni_2O_3H$ and full charge capacity C can be found. The third preliminary experiment thus ends.

FIG. 15 is a diagram showing one example of map MP2 in the second embodiment. Referring to FIG. 15, in map MP2, an amount of generation of $Ni_2O_3H$ in a module (Wa, Wb, Wc, . . . ) is brought in correspondence for each full charge capacity (Ca, Cb, Cc, . . . ) of the module, based on the results obtained through the third preliminary experiment. Thus, in the second embodiment, map MP2 is created in advance through the third preliminary experiment and created map MP2 is stored in storage device 120.

Figure 16:
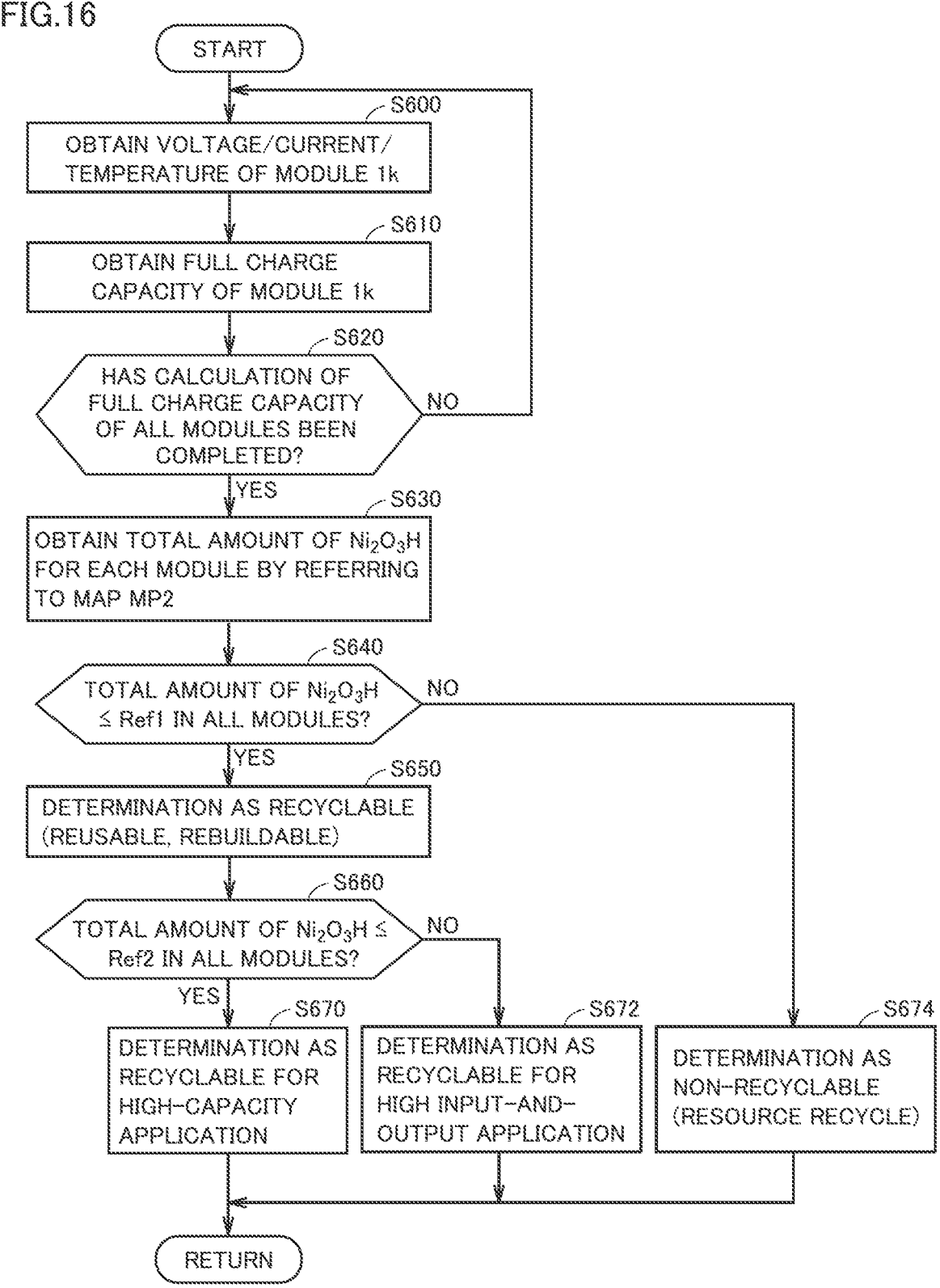
FIG. 16 is a flowchart showing a processing procedure for making determination as to recycle of a battery pack in the second embodiment.

FIG. 16 is a flowchart showing a processing procedure for making determination as to recycle of battery pack 10 in the second embodiment. Referring to FIGS. 2 and 16, in S600, determination device 110 obtains a detection value of a certain module 1k.

In S610, determination device 110 has battery pack 10 charged (which may be discharged) under the control by control device 130 and calculates a full charge capacity Ck of module 1k. Since a technique of calculating full charge capacity Ck is a known technique similar to the technique described in the procedure in S500 in the third preliminary experiment, description will not be repeated.

Determination device 110 repeats processing in S600 and S610 until calculation of the full charge capacity is completed for all modules 11 to 1M (NO in S620), and when calculation of the full charge capacity of all modules 11 to 1M is completed (YES in S620), the process proceeds to S630.

In S630, determination device 110 obtains information indicating a total amount of generation of $Ni_2O_3H$ in module 1k which corresponds to full charge capacity Ck calculated in S610 by referring to map MP2 (see FIG. 15).

Since processing in subsequent S640 to S674 is equivalent to processing in S350 to S384 in the first embodiment (see FIG. 12), detailed description will not be repeated.

As set forth above, according to the second embodiment, map MP2 instead of map MP1 is prepared. By referring to map MP2, the total amount of generation of $Ni_2O_3H$ can be estimated even though determination system 100 is in the off-board state, and whether or not battery pack 10 is recyclable can readily be determined based on a result of estimation. Furthermore, determination device 110 further determines whether battery pack 10 determined as being recyclable is suitable for a high-capacity application or a high input-and-output application also in the second embodiment as in the first embodiment (see S660, S670, and S672). Battery pack 10 determined as being recyclable can thus be made effective use of. Battery pack 10 can be rebuilt as described with reference to FIG. 12 also in the second embodiment.

Though the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A method of recycling a secondary battery containing a nickel-based compound as a positive electrode active material, the method comprising:
    estimating an amount of $Ni_2O_3H$ generated in a positive electrode of the secondary battery based on a detection value resulting from detection of a state of the secondary battery;
    recycling the secondary battery for a high-capacity application when the estimated amount of $Ni_2O_3H$ is smaller than a prescribed reference amount; and
    recycling the secondary battery for a high input-and-output application when the estimated amount of $Ni_2O_3H$ is greater than the reference amount.

2. The method of recycling a secondary battery according to claim 1, wherein
    a full charge capacity of the secondary battery lowers with increase in the amount of $Ni_2O_3H$, and
    the reference amount is determined based on the full charge capacity of the secondary battery.

3. The method of recycling a secondary battery according to claim 1, wherein
    lowering in electric power which can be input to and output from the secondary battery is mitigated with increase in the amount of $Ni_2O_3H$, and
    the reference amount is determined based on the electric power which can be input to and output from the secondary battery.

4. The method of recycling a secondary battery according to claim 1, wherein
    the high-capacity application includes a vehicle-mounted application.

5. The method of recycling a secondary battery according to claim 1, wherein
    the high input-and-output application includes an application as a stationary power supply for electric power regulation.

6. The method of recycling a secondary battery according to claim 1, wherein
    the estimating an amount of $Ni_2O_3H$ includes estimating the amount of $Ni_2O_3H$ generated in the positive electrode based on a voltage value and a temperature of the secondary battery by using data showing relation of the voltage value and the temperature of the secondary battery with the amount of $Ni_2O_3H$ generated in the positive electrode.

7. The method of recycling a secondary battery according to claim 1, wherein
    the estimating an amount of $Ni_2O_3H$ includes estimating the amount of $Ni_2O_3H$ generated in the positive electrode based on a full charge capacity found from a voltage value and a current value of the secondary battery by using data showing relation between the full charge capacity of the secondary battery and the amount of $Ni_2O_3H$ generated in the positive electrode.

8. A secondary battery system configured to determine an application in recycling a secondary battery containing a nickel-based compound as a positive electrode active material, the secondary battery system comprising:
    a storage device configured to store data showing relation between a full charge capacity of the secondary battery and an amount of $Ni_2O_3H$ generated in a positive electrode of the secondary battery; and a determination device configured to calculate the full charge capacity of the secondary battery from a voltage value and a current value of the secondary battery, to estimate an amount of $Ni_2O_3H$ generated in the positive electrode based on the calculated full charge capacity and the data, and to determine an application in recycling the secondary battery based on the estimated amount of $Ni_2O_3H$, the determination device being configured to determine that the secondary battery is to be recycled for a high-capacity application when the estimated amount of $Ni_2O_3H$ is smaller than a prescribed reference amount and to determine that the secondary battery is to be recycled for a high input-and-output application when the estimated amount of $Ni_2O_3H$ is greater than the reference amount.

* * * * *